Sept. 17, 1929.  A. J. BERG  1,728,590

REVERSIBLE REAMER

Filed Nov. 30, 1926

Inventor
Alfred J. Berg
By
Attorney

Patented Sept. 17, 1929

1,728,590

UNITED STATES PATENT OFFICE

ALFRED J. BERG, OF PORTSMOUTH, NEW HAMPSHIRE, ASSIGNOR OF ONE-THIRD TO J. ADAMS DE ROCHEMONT, OF NEWINGTON, NEW HAMPSHIRE, AND ONE-THIRD TO HAROLD C. PREBLE, OF PORTSMOUTH, NEW HAMPSHIRE

REVERSIBLE REAMER

Application filed November 30, 1926. Serial No. 151,724.

My invention relates to expansible reamers and has for its object to provide a reamer of this type which will be reversible and adapted to be operated from either end.

In automobile engines in which the wrist pin extends through the head of the piston, the hole through which it extends is subject to considerable wear and tends to wear unevenly and it becomes necessary to ream out the hole in the piston head, enlarging it very slightly. For this purpose expansible reamers of the type to which my present invention applies have been devised in which helical cutting blades are arranged between cylindrical heads and means are provided by which the cutting blades may be expanded from within. But such expansible reamers as commonly used are adapted to be rotated from one end only.

It is the object of my invention to improve the expansible reamer of the type referred to by providing both ends with means by which it may be rotated to further provide an automatic cutting means and to so construct the reamer that it may be operated from either end in either direction of rotation.

With the object above indicated and other objects hereinafter described in view my invention consists in the construction and combination of elements hereinafter described and claimed.

Referring to the drawings.

Figure 1:
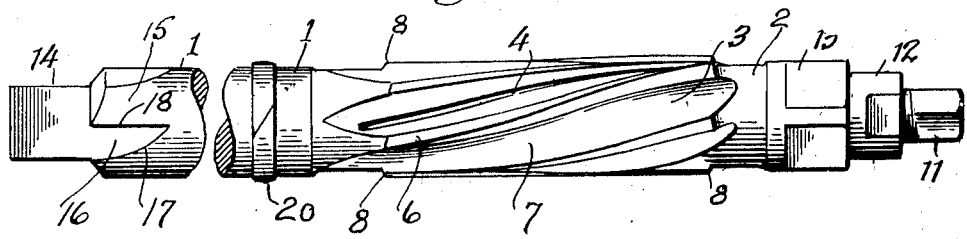
Figure 1 is a side view of an expansible reamer embodying my invention.
Figure 2:
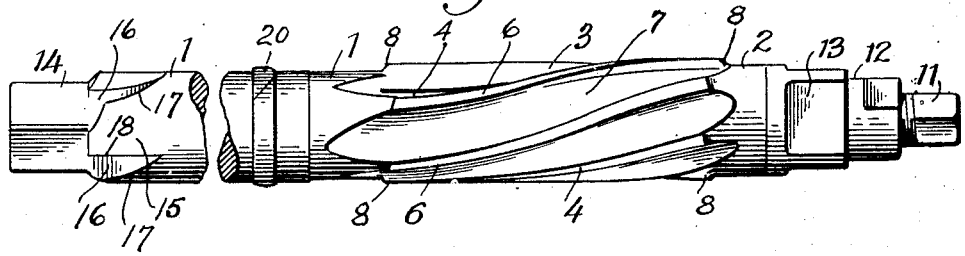
Figure 2 is a similar view but at a different angle.
Figure 3:
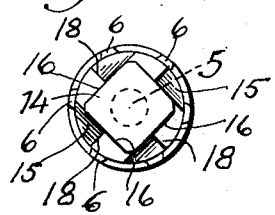
Figure 3 is an end view of the end shown at the left in Figure 1.
Figure 4:
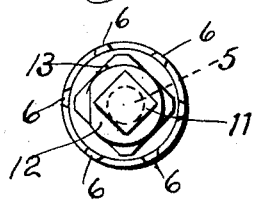
Figure 4 is an end view of the end shown at the right in Figure 1.
Figure 5:
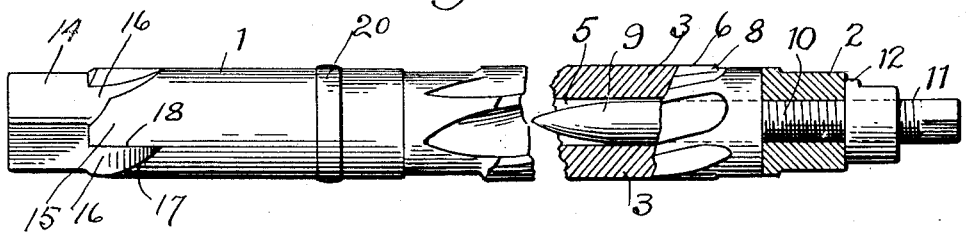
Figure 5 is a side view partly in section.

The reamer body is of the type shown in United States Patent No. 1,532,350, issued April 7, 1925, to W. A. Shatto of which 1 is solid and 2 is axially bored, having between them a series of helical flutes 3 separated one from another by helical slots 4, extending into an axial bore 5. Each flute 3 carries two integral cutting blades 6, the two cutting blades of each flute being separated by helical groove 7. The cutting blades 6 extend radially somewhat beyond the periphery of rings 1 and 2 and at their ends adjacent to ring 1 terminate obliquely to the axial line of the reamer body so as to leave a sharp cutting edge 8. The flutes 3 are arranged, as in the patent to Shatto, above referred to, to be expanded by a cone 9 on axial rod 10 which is provided at its outer end with squared head 11 and is screw threaded to engage screw threads in solid ring 2. By turning head 11 the cone 9 may be advanced or retracted to expand flutes 3 or to permit them to spring back to normal position. A lock nut 12 holds the rod 10 against movement. Cylinder 2 is squared at 13 to receive a wrench.

Cylinder 1 is provided at its outer end with squared head 14 to receive a wrench and has cutting teeth 15 formed in it adjacent the head 14. These cutting teeth 15 correspond in number with the faces of the squared head 14, each of these faces being continued into the cylinder 1 a sufficient distance to afford ample clearance and curved upward as indicated at 17, the cutting face 18 of each tooth being at right angles to the plane indicated at 16.

At a convenient point on the cylinder 1 is arranged a split spring ring 20 which normally is expanded to a diameter slightly greater than that of cylinder 1, but is capable of compression to the diameter of cylinder 1.

My reamer as above described is particularly adapted for reaming out the wrist pin holes in the head of the pistons of automobile or other explosion engines to true them when worn. In use the end on which squared head 14 is carried is inserted in the wrist pin hole and rotated by a wrench applied to the squared head 13. As the reamer is advanced in the wrist pin hole it is guided by the cylinder 1 the ring 20 serving to centre the tool if the hole to be reamed has been worn to a substantial extent. As the reamer is further advanced the cutting blades 6 having been expanded by the head 11 and locking the rod 10 by lock nut 12, cut away the walls of the hole. When the reamer has been advanced until the squared head is within the hole and out of reach of the wrench by which the reamer has been rotated, the wrench may be applied to the squared head 14 and the operation continued until the cutting blades have passed entirely through the hole.

The cutting blades 6 being provided with sharp points 8 at both ends the reamer will cut from either direction.

It will, of course, be understood that the reamer may be made of any diameter and any length desired, and may be used in reaming holes in any material or article. It will further be understood that the ring 20 will be, when expanded, of a diameter only one or two thousandths of an inch greater than the diameter of cylinder 1.

It should further be understood that the heads 13 and 14 need not be square in cross section but may have more than four faces it being essential only that these heads be non-cylindrical in cross section so as to be gripped by a wrench.

Having thus described my invention, what I claim is:

1. In an expansible reamer having helical cutting blades and a cylindrical portion at one end provided with a squared head and having an axial opening for a rod carrying the expanding means, a cylindrical portion at the other end provided with a squared head and having cutting teeth formed in it adjacent the squared end, the cutting teeth corresponding in number with the faces of the squared end and having their cutting edges on the centre line of the faces of the squared end.

2. In an expansible reamer having helical cutting blades and a cylindrical portion at one end provided with a squared head and having an axial opening for a rod carrying the expanding means, a cylindrical portion at the other end provided with a squared head and having cutting teeth formed in it adjacent the squared end, the cutting teeth corresponding in number with the faces of the squared end and having an expansible ring between its cutting teeth and the cutting blades.

In testimony whereof, I hereunto affix my signature.

ALFRED J. BERG.